United States Patent
Rude et al.

(10) Patent No.: US 9,526,204 B2
(45) Date of Patent: Dec. 27, 2016

(54) LATERAL TRANSPORT WHEEL ASSEMBLY

(71) Applicant: CNH Industrial America LLC, New Holland, PA (US)

(72) Inventors: Derek S. Rude, Muenster (CA); Murray Kosokowsky, Pilger (CA)

(73) Assignee: CNH Industrial America LLC, New Holland, PA (US)

( * ) Notice: Subject to any disclaimer, the term of this patent is extended or adjusted under 35 U.S.C. 154(b) by 474 days.

(21) Appl. No.: 14/050,420

(22) Filed: Oct. 10, 2013

(65) Prior Publication Data

US 2015/0101304 A1    Apr. 16, 2015

Related U.S. Application Data

(63) Continuation-in-part of application No. 14/024,256, filed on Sep. 11, 2013.

(51) Int. Cl.
*A01B 73/00* (2006.01)
*A01D 34/00* (2006.01)
(Continued)

(52) U.S. Cl.
CPC ............ *A01D 34/001* (2013.01); *A01D 34/00* (2013.01); *A01D 34/66* (2013.01); *A01D 75/00* (2013.01)

(58) Field of Classification Search
CPC .. A01D 75/002; A01D 75/004; A01D 34/001; A01D 34/00; A01D 34/66; A01D 75/00
(Continued)

(56) References Cited

U.S. PATENT DOCUMENTS

| 1,421,439 A | 7/1922 | Finckh |
| 2,109,098 A | 2/1938 | Baxter |

(Continued)

FOREIGN PATENT DOCUMENTS

| DE | 4309498 A1 | 9/1994 |
| DE | 20113820 | 12/2001 |

(Continued)

OTHER PUBLICATIONS

U.S. Appl. No. 15/099,827, entitled "Pull-Type Disk Mowing Machine Transport System," MacDon Industries Ltd. & Maschinenfabrik Bernard Krone GmbH Applicants, 45 pp.
(Continued)

*Primary Examiner* — Thomas B Will
*Assistant Examiner* — Joan D Misa
(74) *Attorney, Agent, or Firm* — Peter K. Zacharias; Patrick M. Sheldrake

(57) ABSTRACT

A transport wheel assembly for use on an agricultural mower when the mower is configured for lateral transport 90 degrees from the normal operational direction of travel of mower. The transport wheel assembly comprises a moveable frame that pivots approximately 270 degrees between a retracted position when the mower is operating and a transport position, and an actuator to position the moveable frame between the retracted and transport positions. A linkage including a bell crank interconnects the actuator and the moveable frame to enable full extent of pivoting of the moveable frame with a single direction movement of the actuator between an extended and a retracted position. The transport wheel mechanisms also position the transport wheels where they will not interfere with mower operation, especially pivoting of the tongue.

15 Claims, 4 Drawing Sheets

(51) Int. Cl.
*A01D 34/66* (2006.01)
*A01D 75/00* (2006.01)

(58) Field of Classification Search
USPC .......................................................... 56/228
See application file for complete search history.

(56) References Cited

U.S. PATENT DOCUMENTS

| | | | |
|---|---|---|---|
| 2,286,305 A | 6/1942 | Priestley | |
| 2,351,830 A * | 6/1944 | Mitchell | E02F 3/6463 |
| | | | 172/318 |
| 2,540,228 A | 2/1951 | Adkisson | |
| 2,779,261 A * | 1/1957 | Northcote | A01B 21/08 |
| | | | 172/240 |
| 2,833,105 A | 5/1958 | Naery | |
| 2,911,780 A | 11/1959 | Brady | |
| 2,938,588 A | 5/1960 | Stein | |
| 3,241,300 A | 3/1966 | Fell et al. | |
| 3,245,695 A | 4/1966 | Bernard | |
| 3,288,480 A | 11/1966 | Calkins et al. | |
| 3,408,956 A | 11/1968 | Rebenok et al. | |
| 3,515,408 A | 6/1970 | Cagle | |
| 3,523,410 A | 8/1970 | Taylor et al. | |
| 3,577,713 A | 5/1971 | McCarty et al. | |
| 3,590,928 A | 7/1971 | Mirus | |
| 3,648,780 A | 3/1972 | Fueslein et al. | |
| 3,683,602 A | 8/1972 | Scarnato et al. | |
| 3,721,073 A | 3/1973 | Scarnato et al. | |
| 3,786,764 A | 1/1974 | Beers, Jr. et al. | |
| 3,814,191 A | 6/1974 | Tilbury | |
| 3,841,070 A | 10/1974 | Scarnato et al. | |
| 3,881,301 A | 5/1975 | Sawyer et al. | |
| 3,897,832 A | 8/1975 | Leedahl et al. | |
| 3,911,649 A | 10/1975 | Scarnato et al. | |
| 3,919,831 A | 11/1975 | Halls et al. | |
| 3,955,627 A | 5/1976 | Brown | |
| 4,026,365 A | 5/1977 | Andersson et al. | |
| 4,043,403 A | 8/1977 | Anderson et al. | |
| 4,099,364 A | 7/1978 | Kanengieter et al. | |
| 4,106,788 A | 8/1978 | Bohnert | |
| 4,106,813 A | 8/1978 | Goodbary | |
| 4,119,329 A | 10/1978 | Smith | |
| 4,162,085 A | 7/1979 | Miranowski | |
| 4,180,135 A | 12/1979 | Birkenbach et al. | |
| 4,222,334 A | 9/1980 | Peterson | |
| 4,283,071 A | 8/1981 | Pedersen | |
| 4,316,511 A | 2/1982 | Andersen | |
| 4,361,341 A | 11/1982 | Gustafson | |
| 4,418,516 A | 12/1983 | Donovan et al. | |
| 4,418,517 A | 12/1983 | Ehrhart et al. | |
| 4,418,518 A | 12/1983 | Koch et al. | |
| 4,435,948 A | 3/1984 | Jennings | |
| 4,442,662 A | 4/1984 | Jennings | |
| 4,455,034 A | 6/1984 | de Graff et al. | |
| 4,460,193 A | 7/1984 | Dietz et al. | |
| 4,506,904 A | 3/1985 | Kinzenbaw | |
| 4,512,416 A | 4/1985 | Smith | |
| 4,526,235 A | 7/1985 | Kinzenbaw | |
| 4,534,416 A | 8/1985 | Johnson | |
| 4,552,375 A | 11/1985 | Kinzenbaw | |
| 4,555,897 A * | 12/1985 | Degelman | A01B 43/005 |
| | | | 171/65 |
| 4,558,560 A | 12/1985 | Koch | |
| 4,573,309 A | 3/1986 | Patterson | |
| 4,607,996 A | 8/1986 | Koch | |
| 4,660,654 A | 4/1987 | Wiebe et al. | |
| 4,662,646 A | 5/1987 | Schlapman et al. | |
| 4,682,462 A | 7/1987 | Johnson, Sr. | |
| 4,765,639 A | 8/1988 | Murray | |
| 4,831,814 A | 5/1989 | Frisk et al. | |
| 4,867,245 A | 9/1989 | Stevens | |
| 4,871,028 A | 10/1989 | Murray | |
| 4,905,466 A | 3/1990 | Heppner | |
| 4,934,131 A | 6/1990 | Frisk et al. | |
| 4,986,064 A | 1/1991 | Ermacora | |
| 4,991,383 A | 2/1991 | Ermarcora | |
| 5,000,268 A | 3/1991 | Zimmerman | |
| 5,024,279 A | 6/1991 | Warner et al. | |
| 5,025,616 A | 6/1991 | Moss | |
| 5,113,956 A | 5/1992 | Friesen et al. | |
| 5,136,828 A | 8/1992 | Ermacora | |
| 5,199,250 A | 4/1993 | Ermacora | |
| 5,243,810 A | 9/1993 | Fox et al. | |
| 5,274,990 A | 1/1994 | Aron et al. | |
| 5,357,737 A * | 10/1994 | Ermacora | A01D 43/105 |
| | | | 56/13.6 |
| 5,429,195 A | 7/1995 | Turnis | |
| 5,566,536 A | 10/1996 | Krafka et al. | |
| 5,642,607 A | 7/1997 | Stephenson et al. | |
| 5,778,647 A | 7/1998 | McLean et al. | |
| 5,839,516 A | 11/1998 | Arnold et al. | |
| 5,901,533 A | 5/1999 | Ermacora et al. | |
| 5,930,988 A | 8/1999 | Hanson | |
| 5,943,848 A | 8/1999 | Rice et al. | |
| 6,152,240 A | 11/2000 | Nonhoff et al. | |
| 6,189,306 B1 | 2/2001 | Walch | |
| 6,209,297 B1 | 4/2001 | Yeomans et al. | |
| 6,213,219 B1 | 4/2001 | Mosdal et al. | |
| 6,238,170 B1 | 5/2001 | Pingry et al. | |
| 6,260,629 B1 | 7/2001 | Toth | |
| 6,273,449 B1 | 8/2001 | Harkcom et al. | |
| 6,321,852 B1 | 11/2001 | Pratt | |
| 6,336,313 B1 | 1/2002 | Bonnewitz | |
| 6,360,516 B1 | 3/2002 | Harkcom et al. | |
| 6,408,950 B1 | 6/2002 | Shoup | |
| 6,421,994 B1 | 7/2002 | Boucher et al. | |
| 6,467,247 B1 * | 10/2002 | Harrison | A01D 34/001 |
| | | | 56/320.1 |
| 6,485,246 B1 | 11/2002 | Harkcom et al. | |
| 6,546,708 B2 | 4/2003 | Faivre | |
| 6,606,956 B1 | 8/2003 | Paluch | |
| 6,666,010 B2 * | 12/2003 | Beaufort | A01B 73/00 |
| | | | 172/395 |
| 6,702,035 B1 | 3/2004 | Friesen | |
| 6,739,612 B2 | 5/2004 | Colistro | |
| 6,854,251 B2 | 2/2005 | Snider | |
| 6,907,719 B2 | 6/2005 | Ligouy | |
| 7,047,714 B1 | 5/2006 | Stephenson et al. | |
| 7,100,350 B2 | 9/2006 | Breneur | |
| 7,197,865 B1 | 4/2007 | Enns et al. | |
| 7,347,277 B2 | 3/2008 | Enns et al. | |
| 7,552,579 B2 | 6/2009 | Tippery et al. | |
| 7,712,544 B1 | 5/2010 | Misenhelder et al. | |
| 7,849,933 B2 | 12/2010 | Marggi | |
| 7,926,249 B1 | 4/2011 | Cook | |
| 8,112,977 B2 | 2/2012 | Priepke | |
| 8,141,652 B2 | 3/2012 | Poole et al. | |
| 8,209,946 B2 | 7/2012 | Neudorf et al. | |
| 8,292,328 B2 | 10/2012 | Honas et al. | |
| 8,333,249 B1 * | 12/2012 | Minton | A01B 29/02 |
| | | | 172/170 |
| 8,464,508 B2 | 6/2013 | Matousek et al. | |
| 9,179,591 B2 | 11/2015 | Barnett et al. | |
| 9,179,592 B2 | 11/2015 | Snider et al. | |
| 9,185,837 B2 | 11/2015 | Barnett et al. | |
| 9,185,838 B2 | 11/2015 | Chan et al. | |
| 9,185,839 B2 | 11/2015 | Kolegaev et al. | |
| 2002/0005629 A1 | 1/2002 | Rosenboom | |
| 2004/0011538 A1 | 1/2004 | Raducha et al. | |
| 2006/0123764 A1 | 6/2006 | McLean et al. | |
| 2011/0197561 A1 | 8/2011 | Priepke | |
| 2011/0272917 A1 | 11/2011 | Hilsabeck et al. | |
| 2012/0132768 A1 | 5/2012 | Lammerant et al. | |
| 2013/0284467 A1 | 10/2013 | Snider et al. | |
| 2013/0284468 A1 | 10/2013 | Barnett et al. | |
| 2013/0284469 A1 | 10/2013 | Barnett et al. | |
| 2014/0053522 A1 | 2/2014 | Kolegaev et al. | |
| 2014/0083071 A1 | 3/2014 | Fay, II | |
| 2014/0096498 A1 | 4/2014 | Estock et al. | |

(56) References Cited

U.S. PATENT DOCUMENTS

2014/0196429 A1  7/2014 Gantzer
2015/0282426 A1  10/2015 Gantzer et al.
2016/0007534 A1  1/2016 Fay, II

FOREIGN PATENT DOCUMENTS

| EP | 350513 | | 1/1990 |
| EP | 764396 | | 3/1997 |
| EP | 628237 | B1 | 8/1997 |
| EP | 818134 | | 1/1998 |
| EP | 823985 | | 2/1998 |
| EP | 1769668 | | 4/2007 |
| EP | 1769668 | B1 | 4/2007 |
| FR | 2332690 | | 6/1977 |
| FR | 2712137 | | 5/1995 |
| FR | 2752356 | | 2/1998 |
| GB | 2194872 | A | 3/1988 |
| GB | 2232055 | | 12/1990 |
| GB | 2490342 | | 10/2012 |
| GB | 2504093 | | 1/2014 |
| WO | WO2013135676 | | 9/2013 |

OTHER PUBLICATIONS

U.S. Appl. No. 15/099,827, entitled "Pull-Type Disk Mowing Machine Transport System," MacDon Industries Ltd. & Maschinenfabrik Bernard Krone GmbH Applicants, 16 pp.

* cited by examiner

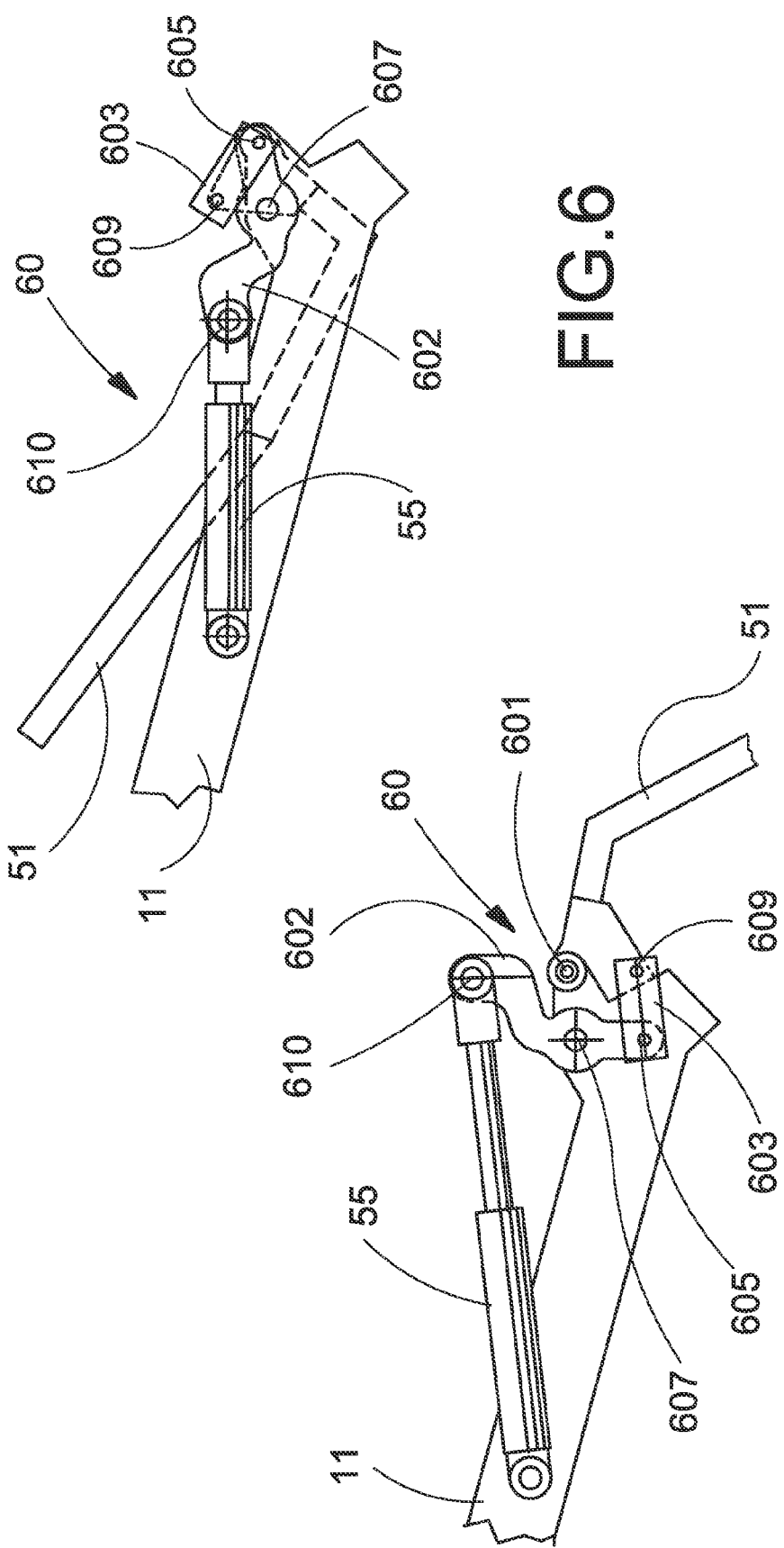

US 9,526,204 B2

LATERAL TRANSPORT WHEEL ASSEMBLY

CROSS REFERENCE TO RELATED APPLICATIONS

This application claims the benefit of priority to U.S. Patent Application entitled "Integral Lateral Transport of a Mower", Ser. No. 14/024,256, filed on Sep. 11, 2013.

This application is related to U.S. Patent Application entitled "Integral Lateral Transport of a Mower", Ser. No. 14/024,256, filed on Sep. 11, 2013; and U.S. Patent Application entitled "Hitch Swing Cylinder Mounting Point Repositioning Mechanism", Ser. No. 14/081,996, filed on Nov. 15, 2013. These related applications are herein incorporated by reference.

BACKGROUND OF THE INVENTION

The present invention relates generally to agricultural harvesting machines, and more particularly relates to a mechanism for repositioning the machine as it is trailed behind a prime mover to enable the machine to be transported in less than its normal operating width.

Agricultural mowers are well known and include self-propelled and pull-behind types. One common problem with pull-behind mowers involves transporting the machines between fields as the width of the machine may be 15 feet or more. Machine movement may be necessary over farm lanes, through gates or even some highways where the machine width will not allow passage in the operating orientation. One solution is to reconfigure the mower for transport by re-orienting the mower 90 degrees from its normal operational orientation and towing the mower along its operational lateral axis. This approach generally involves the addition of mechanisms to reorient the wheel axles of the wheels that support the unit in a mowing configuration, hereinafter referred to as "mowing wheels," 90 degrees for lateral transport or add transport wheels that can be deployed for lateral transport. The additional transport wheels and positioning mechanisms are typically complex and often encumber normal operation of the mower.

It would be advantageous to provide an agricultural mower that could be conveniently re-oriented for over-the-road transport towing in the direction of its operational lateral axis. Further advantages would be realized by a transport wheel mechanism that is stows a transport wheel able in a manner minimizing the impact on mower operation when not in use, but that enables the transport wheel to be quickly and easily deployed for stable lateral transport of the mower. Still further advantages would be realized by a lateral transport system that can be produced with less cost that the separate trailer lateral transport option it replaces.

SUMMARY OF THE INVENTION

Accordingly, the present invention, in any of the embodiments described herein, may provide one or more of the following advantages:

It is an object of the present invention to provide a moveable frame for supporting an agricultural mower in a generally transverse orientation to the direction of travel for mowing operation, and in a generally longitudinal orientation in line with the direction of travel for non-operational transport. The mower frame includes a pivoting tongue to allow connection to a prime mover. A pair of mowing wheels is provided adjacent to a rearward end of the mower frame aligned for travel as the mower and frame are transversely oriented. A pair of transport wheels is also provided, the transport wheels being alignable for travel generally perpendicularly to the operational travel direction, each transport wheel having a moveable support for positioning of the respective transport wheel in a deployed position or a non-deployed position.

The frame further includes a draft tongue pivotally connected to the frame for movement about an upstanding pivot axis. The draft tongue may be positioned in at least a first position for towing the mower with a prime mover for mowing operation and a second position in which the draft tongue is aligned to pull the mower in a longitudinal transport orientation trailing behind the prime mover. The mower frame may be operationally angled in relation to the draft tongue to allow the mower frame to be trailed along a path offset from the path of the prime mover. The configuration of the first and second transport wheel supports is such that the transport wheel and support positions when the transport wheels are not deployed does not interfere with pivoting movement of the draft tongue.

One of the transport wheels includes a moveable frame that positions the wheel generally aft of the forward cutting edge of the mower and above the mower housing during mower operation. The moveable frame is configured to maintain a sufficiently low profile to avoid contact with the mower tongue while the mower is in operation. The stowed transport wheel position also minimizes adverse impact on the mower center of gravity and tongue weight. The moveable frame pivots approximately 270 degrees when being deployed for mower transport to move the transport wheel to a position ahead of the forward cutting edge of the mower.

A linkage including a bell crank enables a conventional hydraulic cylinder to pivot the frame through the required arc without requiring an elevated anchor point for the cylinder which would adversely affect the low profile of the moveable frame when stowed. The hydraulic cylinder rotates the bell crank approximately 90 degrees and through the linkage connecting the ball crank to the moveable frame, rotates the moveable frame approximately 270 degrees.

Yet another object of the present invention to a moveable frame for supporting an agricultural mower that is selectively positionable in a transverse operational orientation or a lateral transport orientation that is durable in construction, inexpensive of manufacture, carefree of maintenance, easily assembled, and simple and effective to use. The moveable frame relies on well-known methods for repositioning moveable elements on agricultural equipment and enables re-positioning of the mower between transport and operational configurations with minimal machine operator effort.

These and other objects are achieved in accordance with the instant invention as described in detail herein.

BRIEF DESCRIPTION OF THE DRAWINGS

The advantages of this invention will be apparent upon consideration of the following detailed disclosure of the invention, especially when taken in conjunction with the accompanying drawings wherein:

FIG. 5 is a detail view of the transport wheel actuator mechanism shown when the transport wheel is in the deployed position; and FIG. 6 a detail view of the transport wheel actuator mechanism shown when the transport wheel is in the non-deployed position.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures. Alpha designations following a numeric designator are used to distinguish the two similar parts, typically right side/left side on the generally symmetrical invention; reference to the numeric designator alone indicates the either part.

Figure 1:
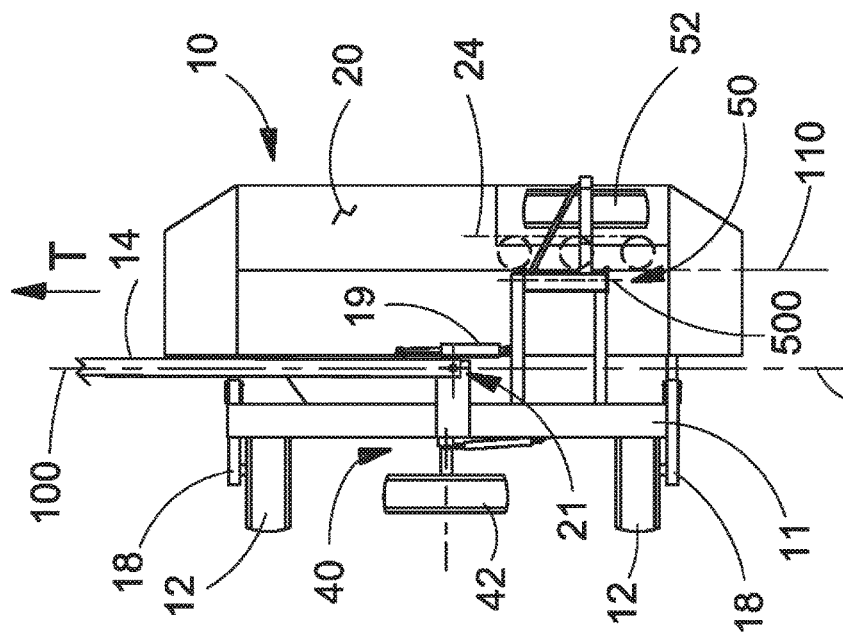
FIG. 1 is a plan view of an agricultural pull-behind harvester incorporating a first embodiment of the lateral transport system of the present invention and is shown in an operating configuration.

Referring now to the drawings and particularly to FIG. 1, an agricultural implement 10 incorporating the principles of the instant invention can best be seen. Implement 10 as presented herein is what is generally known as a pull-behind center-pivot mower and is provided with a generally conventional movable frame 11 mobilely supported for operation over the ground by a pair of transversely spaced-apart trailing main wheels 12 and a draft tongue 14 configured for connection to a tractor for forward movement (direction "T") along a normal travel axis 100. A mower 20 is operably connected to and supported by the frame 11. Trailing main wheels 12 are preferably connected to the frame 11 by including a pair of movable trailing arms 18 whose position is managed by wheel actuators 13 to raise and lower the main wheels relative to the frame 11 thereby enabling the vertical position relative to the ground of frame 11 to be adjusted. The wheel 12 adjustment capability allows the operating height of the mower 20 above the ground to be readily adjusted. Implement 10 is shown in an operating configuration in FIG. 1 with the mower 20 generally transversely aligned to the direction of travel along transverse axis 110.

Figure 3:
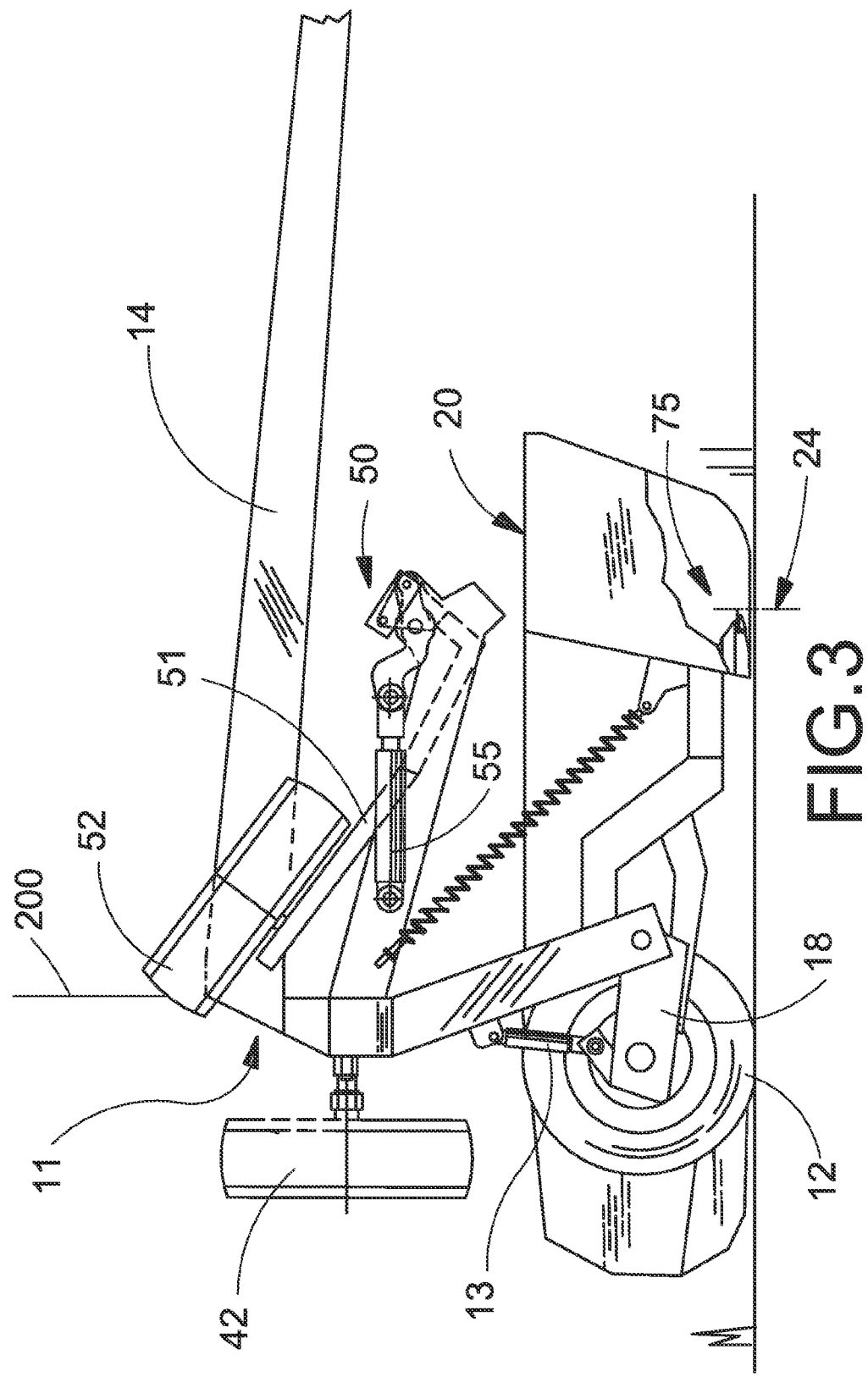
FIG. 3 is an elevation view of the agricultural harvester shown configured for normal operation with the transport wheel mechanism of the present invention shown in the retracted position.
Figure 4:
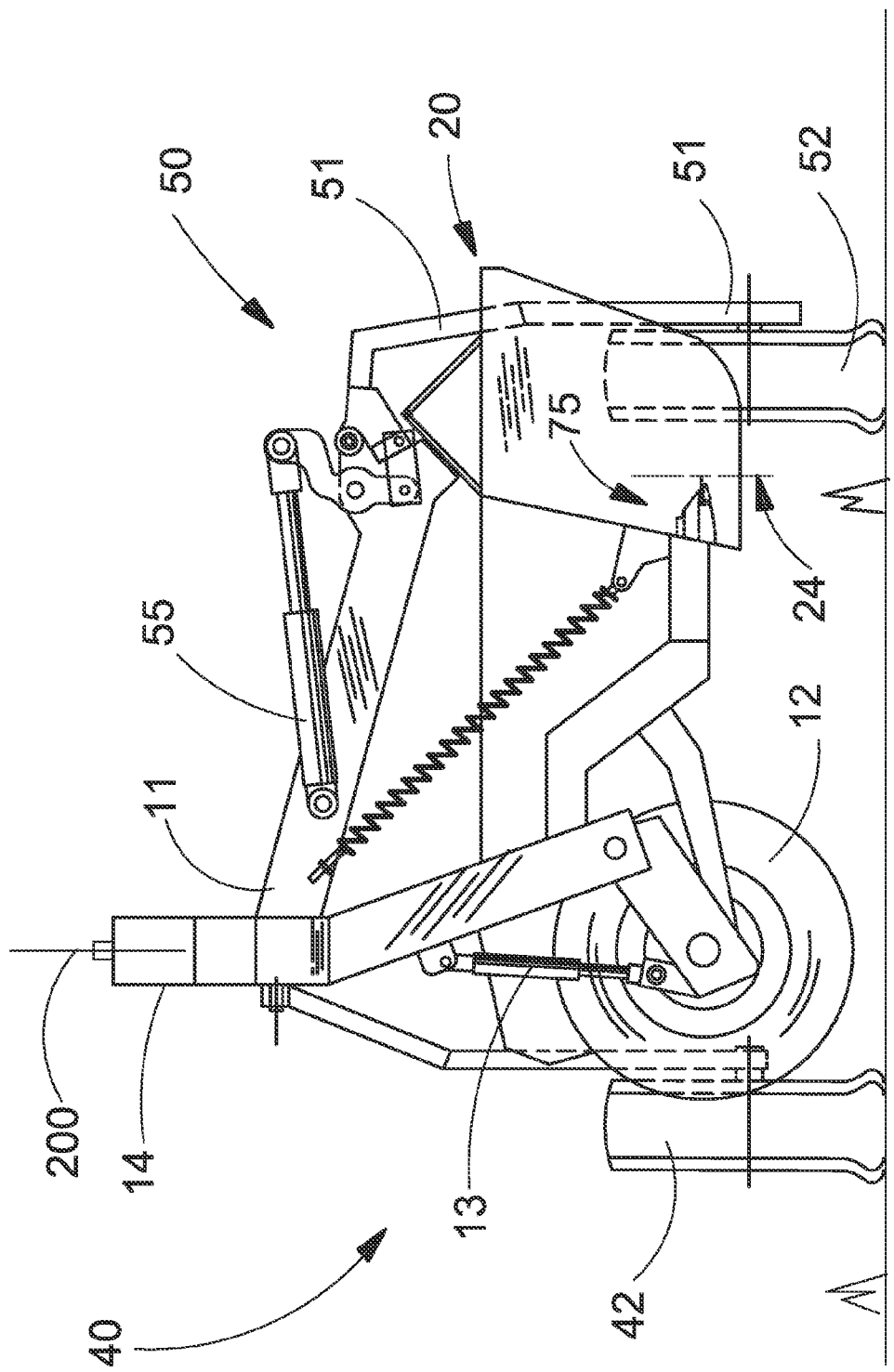
FIG. 4 is an elevation view of the agricultural harvester of FIG. 3 configured for transport and the transport wheel mechanism shown deployed for use.

As is common in many pull-behind mowers, the draft tongue 14 is pivotally connected to the implement frame 11 at pivot connection 21, the pivotal movement thereof rotating the frame 11 and the connected mower 20 about an upstanding implement pivot axis 200 (see FIGS. 3 and 4). This pivotal movement between the frame 11 and tongue 14 normally enables the mower 20 and travel axis 100 to be laterally offset from the tractor during operation to avoid driving the tractor through standing crop material. Pivotal movement between the frame 11 and the tongue 14 about the implement pivot axis 200 is typically accomplished by a pivot actuator 19 interconnecting the tongue 14 and the frame 11, movement of which is selectively controlled by the tractor operator using the tractor hydraulic control system. Through manipulation of the implement pivot actuator 19, typically a hydraulic cylinder, the mower 20 can be angled relative to the draft tongue 14 to operative position outboard to the right or left of the tractor so that the implement 10 can be operated without the tractor running over the standing crop. A typical range of pivoting is shown as arc "A" in FIG. 1 and is commonly angled up to 45 degrees in either direction from the normal (operational) travel axis 100 as shown in FIG. 1. In the present invention, the pivot actuator 19 is modified to increase the pivoting range of the draft tongue 14.

Figure 2:
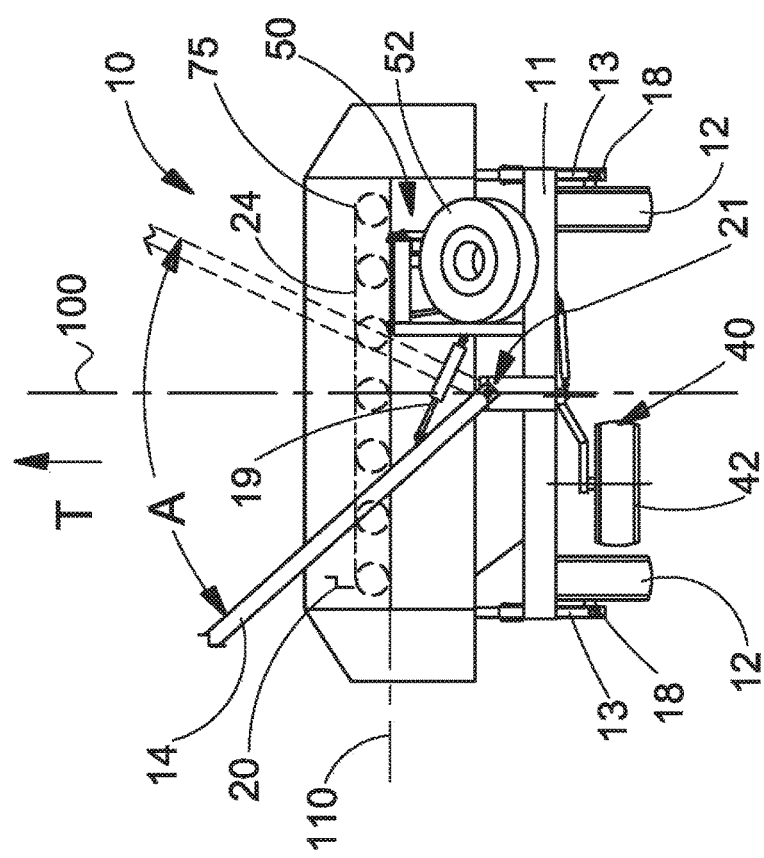
FIG. 2 is a plan view of the agricultural harvester shown in FIG. 1, wherein the harvester is shown configured for transport.

Referring now to FIG. 2 in conjunction with FIG. 1, the implement 10 is shown configured for lateral transport of the mower 20 wherein the transverse axis 110 of the mower is aligned in parallel with the direction of travel (axis 100). A pair of moveable transport wheel supports 40, 50 each having a respective transport wheel 42, 52, allows the implement to be in a lateral transport configuration. The transport wheel supports 40, 50, are shown in a non-deployed position in FIG. 1 and in a deployed position in FIG. 2. Additionally, the draft tongue 14 is pivoted beyond the normal operational range (as shown in FIG. 1) to a transport position aligned generally perpendicularly to the operational travel direction (FIG. 1) bringing the transverse axis 110 generally parallel to the transport travel axis 100 to allow the implement to be transported in a lateral configuration, shown in FIG. 2.

Pivoting of the frame 11 and draft tongue 14 enables the frame 11 to be positioned in at least an operating position in which the transverse axis 110 is oriented transversely to the travel axis 100, and a transport position in which the transverse axis is oriented generally parallel to the travel axis 100. The operating position is shown in FIG. 1 and may include draft tongue angled orientations within the range "A" as illustrated. The transport position is shown in FIG. 2. As described herein, the travel axis 100 is laterally positioned so that it intersects the upstanding pivot axis 200, regardless of the position of the main frame.

Specifically referring to FIGS. 3 through 6, a transport wheel support 50 comprising a support arm 51 moveably connected to the frame 11 for pivoting movement about a support arm pivot axis 500. The orientation of support arm pivot axis 500 and the configuration of support arm 51 enable the second transport wheel 52 to be moved between a non-deployed position, generally above the mower 20 and cutterbar 75 as shown in FIG. 3, and a deployed position outwardly adjacent to the operational leading end 24 of the cutterbar 75, shown in FIG. 4. Provisions may be provided in the mower shield panels to retract some panels to allow the second transport wheel to be more closely positioned adjacent to the leading edge of the cutterbar 75. Movement of the support arm 51 is accomplished by an actuator 55.

In order for the non-deployed position of the transport wheel to avoid interference with operation of the mower, specifically angling of the draft tongue 14, the transport wheel support 50 is designed with a low profile and to position the transport wheel 52 sufficiently rearwardly to avoid interference with the draft tongue 14. The rearward positioning also maintains the mower center of gravity sufficiently low when configured for operating to assure avoid lifting an inside mowing wheel 12 during turning maneuvers, especially on sloping terrain. To this end, the support arm 51 pivots approximately 270 degrees (meaning about three-quarters of a full circle rotation) between the non-deployed position and the deployed positions. The transport wheel 52 is moved from a non-deployed position above the mower and sufficiently rearward to avoid interference with the draft tongue 14 to a deployed position where the wheel is moved outboard of the leading end 24 of the cutterbar 75 and sufficiently downward to contact the ground and elevate the frame 11 for transport.

Movement of the support arm 51 through a 270 degree sweep by actuator 55 requires a mechanism 60 so that the actuator can accomplish the movement in a single-direction movement (e.g., extension or retraction). The mechanism 60 comprises a bell crank 602 connected to the frame 11 at a crank pivot 607, the bell crank having a first connector 610 to which one end of actuator 55 is connected and a second connector 605 to which an elongate link 603 is connected at one end disposed on opposing ends with the crank pivot 607 intermediately positioned. The actuator 55, preferably a hydraulic cylinder, is selectively moveable between extended and retracted positions, which through the mechanism 60, correspond to the deployed and non-deployed positions of the transport wheel support arm 51, respectively. Link 603 is connected to a second connector 609 which is mounted on the support arm 51 eccentrically positioned to the support arm pivot 601. Note that support arm pivot 601 is aligned to allow the support arm 51 to pivot about the support arm pivot axis 500. As the cylinder 51 extends or retracts, the bell crank 602 is rotated approximately 90 degrees about crank pivot 607. Rotation of the bell crank 602 is transferred to the support arm 51 by link 603. Differences in the radial spacing of first and second connectors 610, 605 from the crank pivot 607 allow the input movement of the actuator 51 to be multiplied and cause the support arm 51 to be rotated to a greater extent. In the preferred embodiment, the rotation is approximately 270 degrees.

Compared to known transport wheel mechanism that pivot approximately 90 degrees, the present design moves the transport wheel 52 behind the leading edge of the cuterbar so that the wheel does not interact with standing crop entering the mower and allows the wheel to be positioned closely above and adjacent to the mower housing to minimize any adverse impacts on the machine center of gravity. Designs that rotate similar transport wheels only 90 degrees position the transport wheels ahead of the cutterbar which interferes with the standing crop as the mower approaches and increases the weight on the draft tongue.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A mechanism for positioning a transport wheel on an agricultural mower, the mower comprising a main frame supporting a transversely aligned cutterbar, and a draft tongue connected to the main frame and pivotal about an upstanding hitch axis for pulling the mower forwardly or rearwardly along a normal travel axis, the mechanism comprising:
   a moveable support frame comprising a pivoting end and a free end, the pivoting end being connected to the main frame for movement about a pivot axis between a retracted position and a deployed position, the free end having a transport wheel connected thereto;
   an actuator comprising opposing first and second ends defining a length therebetween, the length being selectively adjustable between a first position and a further extended second position, the first end being connected to the main frame; and
   a linkage connecting the second end of the actuator to the moveable support frame, the linkage causing movement of the moveable support frame from the retracted position to the deployed position as the actuator length is adjusted from the first position to the second position, the transport wheel being positioned wherein at least a portion of the wheel is directly above a portion of the mower and rearward of the cutterbar when the support frame is in the retracted position, movement of the support frame towards the deployed position causing the wheel to be positioned forwardly and at least partially below the cutterbar and to be aligned for rotation allowing movement of the mower when the main frame is rotated to align a cutting width of the cutterbar with a direction of the normal travel axis.

2. The mechanism of claim 1, wherein the support frame pivots at least 180 degrees when moving the transport wheel between the retracted and the deployed positions.

3. The mechanism of claim 2, wherein the support frame pivots approximately 270 degrees when moving the transport wheel between the retracted and the deployed positions.

4. The mechanism of claim 1, wherein the pivot axis is generally perpendicular to the travel axis.

5. The mechanism of claim 1, wherein the moveable support frame is positioned, when in the retracted position, to preclude interference with pivotal movement of the draft tongue.

6. The mechanism of claim 5, wherein the moveable support frame is positioned, when in the retracted position, to allow the draft tongue to move above the main frame without interference.

7. A mechanism for positioning a transport wheel on an agricultural mower, the mower comprising a main frame supporting a transversely aligned cutterbar and a draft tongue connected to the main frame and pivotal about an upstanding hitch axis for pulling the mower forwardly or rearwardly along a normal travel axis, the mechanism comprising:
   a moveable support frame comprising a pivoting end and a free end, the pivoting end being connected to the main frame for movement about a pivot axis between a retracted position and a deployed position, the free end having a transport wheel connected thereto;
   an actuator comnprising opposing first and second ends defining a length therebetween, the length being selectively adjustable between a retracted length and an extended length, the first end being connected to the main frame; and a linkage connecting the second end of the actuator to the moveable support frame, the linkage causing movement of the moveable support frame from the retracted position to the deployed position as the actuator length is adjusted from the retracted length to the extended length, the transport wheel being positioned generally above and rearward of the cutterbar when the support frame is in the retracted position, movement of the support frame toward the deployed position causing the wheel to be positioned forwardly and at least partially below the cutterbar and to be aligned for rotation allowing movement of the mower when the main frame is rotated to align the cutterbar parallel with the normal travel axis, wherein the linkage comprises a bell crank comprising spaced apart first and second end connectors and a pivotal connection to the main frame disposed therebetween, the first end connector being connected by a tie link to the support frame, the second end connector being connected to the second end of the actuator.

8. A transport wheel assembly for use in lateral transport of an agricultural pull-behind implement, wherein an elongate tongue is connected to a main frame of the implement for operably pulling the implement in at least a forward direction along a normal travel axis, the main frame pivotally coupled to the tongue and movable between an operating position and a transport position, the main frame supporting a crop engaging apparatus extending between two sides of the implement transverse to the normal travel axis when in the operating position, the implement comprising at least one main wheel for supporting the main frame as the implement is operationally aligned and propelled along the normal travel axis, the transport wheel assembly comprising:

a moveable support frame connected at one end to the main frame and supporting a transport wheel at an opposite end;

an actuator having an adjustable length wherein extension and retraction of the actuator causes movement of the support frame between a retracted position wherein the transport wheel is at least partially directly above a portion of the implement, rearward of the crop engaging apparatus, and forward of the rearward end of the main wheel and a deployed position wherein the transport wheel is generally forward of and at least partially below the crop engaging apparatus and aligned for rotation allowing movement of the implement along the normal travel axis when the main frame is rotated such that the normal travel axis passes through the sides of the implement when in the transport position.

9. The transport wheel assembly of claim 8, further comprising a linkage connecting the actuator to the moveable support frame, the linkage causing movement of the moveable support frame from the retracted position to the deployed position as the actuator length is extended, the transport wheel being positioned generally above and rearward of the crop engaging apparatus when the support frame is in the retracted position, movement of the support frame toward the deployed position causing the wheel to be positioned forwardly and at least partially below the crop engaging apparatus.

10. The transport wheel assembly of claim 9, wherein the moveable support frame pivots at least 180 degrees when moving the transport wheel between the retracted and the deployed positions.

11. The transport wheel assembly of claim 10, wherein the linkage comprises a bell crank comprising spaced apart first and second end connectors and a pivotal connection to the main frame disposed therebetween, the first end connector being connected by a tie link to the moveable support frame, the second end connector being connected to the actuator.

12. The transport wheel assembly of claim 11, wherein the moveable support frame pivots about an axis generally parallel to the normal travel axis when the main frame is in the transport position.

13. The transport wheel assembly of claim 12, wherein the moveable support frame is positioned, when in the retracted position, to preclude interference with pivotal movement of the tongue relative to the main frame.

14. The transport wheel assembly of claim 13, wherein the moveable support frame is positioned, when in the retracted position, to allow the tongue to move above the main frame without interference.

15. A transport wheel assembly for use in lateral transport of an agricultural pull-behind implement, the implement comprising an elongate tongue for operably pulling the implement in at least a forward direction along a normal travel axis, a main frame pivotally coupled to the tongue and movable between an operating position and a transport position, the main frame supporting a crop engaging apparatus transverse to the normal travel axis when in the operating position, and at least one main wheel for supporting the main frame as the implement is operationally aligned and propelled along the normal travel axis, the transport wheel assembly comprising:

a moveable support frame connected at one end to the main frame and supporting a transport wheel at an opposite end; and an actuator movable between a first position and a second position, extension and retraction of the actuator causing movement of the support frame to position the transport wheel generally above and rearward of the crop engaging apparatus when the actuator length is retracted and generally forward of and at least below the crop engaging apparatus when a lenght of the actuator is extended and align the transport wheel for rotation allowing movement of the implement along the normal travel axis when the main frame is rotated to align the crop engaging apparatus parallel to the normal travel axis when in the transport position, wherein the moveable support frame pivots approximately 270 degrees when moving the transport wheel between retracted and deployed positions.

* * * * *